March 1, 1938. LE ROY J. LEISHMAN 2,109,540
MEANS AND METHOD OF COLORING LIGHT FORMED IMAGES
Original Filed June 6, 1931  2 Sheets-Sheet 2

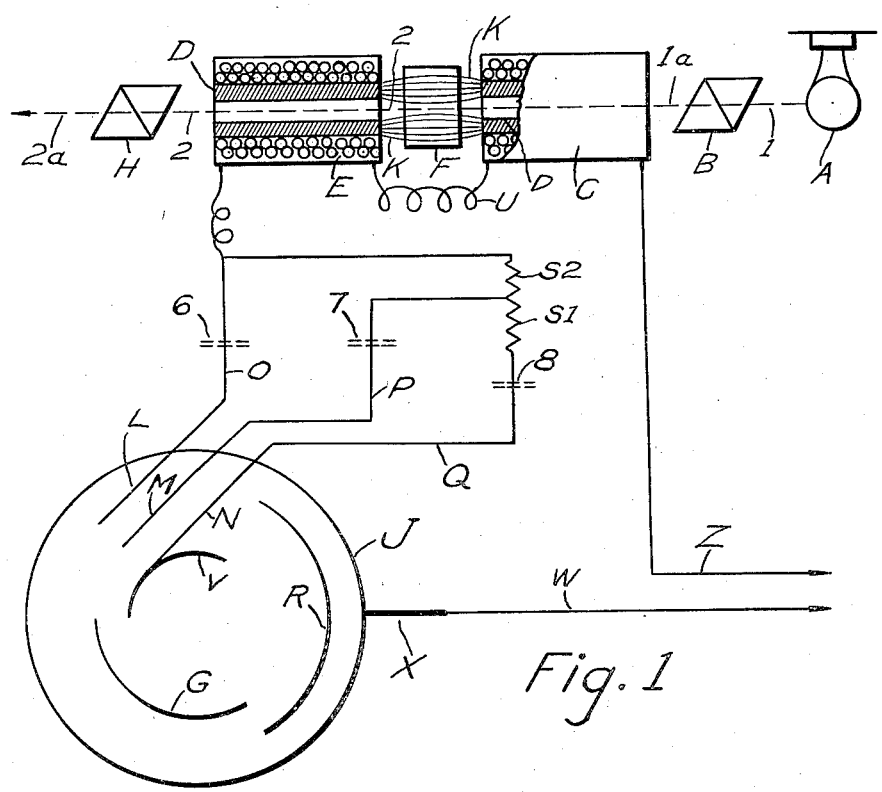
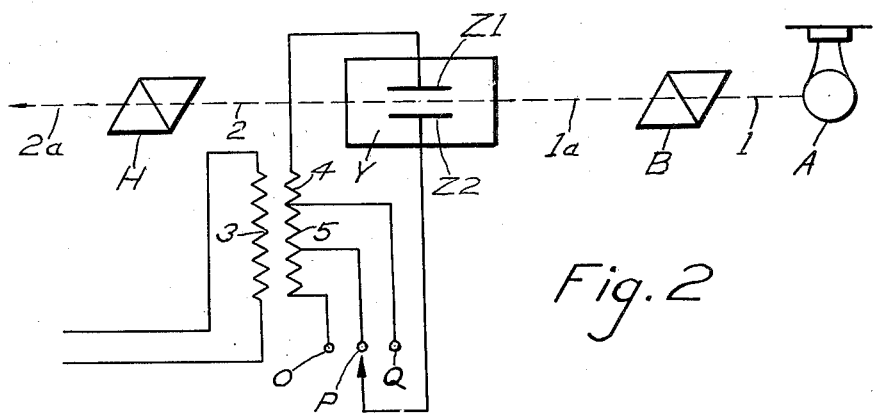

INVENTOR:
Le Roy J. Leishman

Patented Mar. 1, 1938

2,109,540

UNITED STATES PATENT OFFICE 2,109,540

MEANS AND METHOD OF COLORING LIGHT-FORMED IMAGES

Le Roy J. Leishman, Los Angeles, Calif.

Original application June 6, 1931, Serial No. 542,606. Divided and this application August 5, 1935, Serial No. 34,719

21 Claims. (Cl. 178—5.4)

This application is a division of my original application, Serial Number 542,606 filed June 6, 1931, now Patent No. 2,010,307. The invention herein described relates to improvements in coloring light-formed images, replicas of objects and scenes made visible at a location distant from the objects and scenes and possibly at a later time, as in television, motion pictures and the like, and more particularly for producing the light-formed images in their natural colors.

It is well known that by using the three fundamental colors—red, green and blue-violet—the eye may be made to see any color. In light-formed images, therefore, these are the only basic rays required to reproduce all the original colors of objects. If three separate pictures, containing respectively the red, green and blue-violet tones entering into the colors of the original scene, are produced in identical positions within the time period of the persistence of vision, they will blend on the retina and give the effect of a single picture in true natural colors.

It has been found by various kinds of apparatus and different physical experiments, that persistence of vision will endure for about one-sixteenth of a second, and this time period has been adopted in general for television work and in certain classes of illumination. In ordinary black and white transmitted images, the scanning disc or drum is usually arranged to be driven at a speed such that it makes one rotation in one-sixteenth of a second, or less. However, for television in natural colors, it is necessary that three colored images be exhibited to the eye within one sixteenth of a second, which means that the scanning disc or drum must make a complete revolution within one-third of the time required for uncolored or black and white pictures, so that the entire picture may be shown three times, each time with a different color, within the time limit of one-sixteenth of a second. Thus the eye will behold a single picture formed from the three color tones selected within the time period of persistence of vision, and it is on this fact that the present invention is based.

The general methods of transmitting and receiving such television images in color are described in my original application.

One of the objects of the invention herein described is to provide practical and efficient means and methods for producing different predetermined colored rays for use in such a natural color television system or other system for reproducing images in natural colors, and for changing the color of such rays in a predetermined sequence or cycle so that successive pictures may be formed, for example, in red, green and blue-violet respectively.

The colors are obtained by polarizing white (polychrome) light and subjecting the polarized light to electro-magnetic or electro-static stresses under which influences a single color is derived from the polarized light, the color depending on the degree of the etheric or molecular stress applied. In any one of the three colors selected, the color derived is pure, free from the defects inherent in pigments, and they blend into natural shades and tints to produce the optical effect of many more colors than the three actually imparted to the light-formed pictures or images.

With the foregoing and other objects in view, the invention consists in the novel and useful formation, construction, interrelation and combination of parts, members and features, as well as mode and methods of use thereof, and steps and performances taken and had, all as hereinafter described, shown in the drawings and finally pointed out in the claims.

In the drawings:

Fig. 1 is a diagrammatic indication, partly in section, of means for light-polarization and electromagnetic means for obtaining colors for received images;

Fig. 2 is a diagrammatic indication of light-polarization and electro-static means for obtaining colors from white light for received images.

Figure 3:
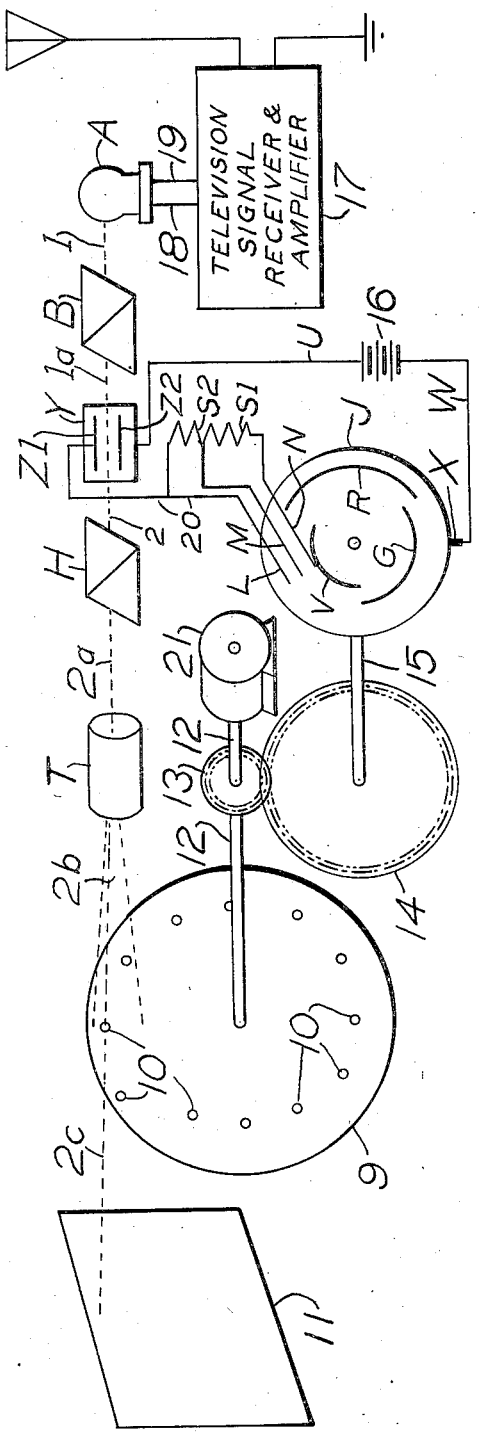
Fig. 3 is a diagrammatic representation of natural color television receiving apparatus embodying the invention herein described.

Fig. 1 shows means for obtaining the desired colors by appropriate apparatus in the formation of a received image, no scanning means being indicated. A is a source of white light modulated by the transmitting apparatus, sending the ray of white light 1 to a polarizing means B. The light rays 1a are polarized by means B and this polarized light is passed through a solenoid winding C having a tubular iron core D, the central hole being made in the core to permit passage of light axially therethrough. Co-axial with solenoid C is solenoid E, likewise having a tubular iron core D, the inner ends of the solenoids C and E being separated to permit mounting a piece of flint-glass F having the desired thickness, and its periphery being circular, rectangular or any other convenient form. When electric current is passed through solenoids C and E, a magnetic field, indicated by fine lines K, is set up across the gap between their neighboring ends, which lines of force pass through the flint-glass F. This transparent material and certain others have the property of rotating the plane of polarized light under the influence or stress of a magnetic field. The polarized light beam 2 has had its plane rotated to a certain degree, depending on the intensity of the magnetic field when it has reached position marked 2, having passed through the transparent substance F. This ray of light 2 passes on leftward to an analyzer H, and emerges at 2a as a colored beam, the color depending on the strength of the magnetic field for certain fixed conditions. The colored light 2a proceeds to any preferred scanning means and image-frame such as have been depicted and described in my original application Serial Number 542,606, or any other convenient arrangement of the same general character. J is a rotating disc or other commutating device having contact segments mounted thereon, R, G, V. Brushes L, M and N contact respectively with segments R, G, V; and wires O, P and Q connect respectively with brushes L, M and N. Current through wire Q passes through a resistance S1 plus S2, enters solenoid winding E through which it passes, and thence by wire U through solenoid C, finally passing out at main wire Z. Wire W is connected to brush X, which contacts with disc J and thereby transmits current from wire W to, say, wire Q. This completes the circuit, assuming that the portions of the system not shown to which wires Z and W connect, form a path between these two wires. Wire P, which is connected with wire W through previously described means, passes to solenoid winding E through resistance S2; but wire O, likewise connected to wire W, passes to the solenoid windings without any resistance in circuit, all as indicated in the diagram. The condensers 6, 7 and 8 are optional. The segments R, G, V on rotating disc J follow arcs of circles drawn about the centre of the disc, each whereof subtends 120 degrees so that through one-third revolution of the disc, current passes through the solenoid windings E and C with the maximum resistance in series therewith, and for one-third of a revolution of the commutating disc J, current passes through the solenoid windings with only the resistance S2 in series, while during the remaining one-third of the revolution, current passes directly through solenoid windings E and C without any resistance in circuit. Obviously, the strength of the magnetic field K will be least when wire Q with the maximum resistance conveys current to the windings and will be greater for current flow over wire P and the lesser resistance S2 and greatest for current flow via wire O with still less, or a negligible, resistance in circuit. Since the colors obtained, after the light has passed from source A through the various parts and members and exits from analyzer H at 2a, depend on the strength of the magnetic field, it is obvious that three different colors will appear with one revolution of disc J, and by this means the desired colors may be obtained and maintained throughout the rotation or complete cyclical movement of a scanning means if the angular velocity of disc J is properly adjusted to make one-third of a revolution for each complete formation of an image.

Fig. 2 indicates a method of obtaining desired colors from polarized light by means of electrostatic stress, being in other respects similar to the previously described method depicted in Fig. 1. A is a source of white light modulated by the sending apparatus; B is a polarizer receiving light ray 1 which emerges from polarizer B as a polarized light ray 1a. Y is a condenser having a dielectric which has certain specific properties, viz; it must be transparent and rotate the plane of polarization under "charge" or electro-static stress. The ray 1a of polarized light passes through the dielectric and between electrodes Z1 and Z2, and emerges as ray 2 to pass on to an analyzer H from which it emerges as a colored ray 2a, which is directed to a scanning device, the color depending on the electro-static stress, or on the voltage, across plates Z1 and Z2. Change in color, therefore, requires change in the voltage impressed on the electrodes Z1 and Z2. This voltage change may be effected in a number of ways, one way being shown in Figs. 1 and 2.

The incoming source of electrical supply may be connected to the primary 3 of a transformer or induction coil, the secondary whereof has a plurality of taps, as shown at O, P and Q. One end of the secondary winding is connected with plate Z1, while plate Z2 has a wire adapted to be connected with any of the said taps, as by the commutating disc J with its contact segments depicted in Fig. 1. When plate Z2 is connected to tap Q, the voltage between the plates is that produced by that portion of the secondary 4; if the plate Z2 be connected with tap P, the voltage across the plates will be that produced by 4 plus 5, while if the commutating disc connects plate Z2 to tap O, the entire secondary voltage is impressed on the condenser. By use of any appropriate switching means, whereby the connections are shifted from tap to tap with each complete cycle of a scanning device, provided suitable voltages are arranged for each tap from the secondary, the colors of the light directed to the scanning device will be changed with each cycle of complete image formation. As in using the device shown in Fig. 1, the rays 2a emerging from the analyzer may be directed by position or any convenient optical means to the scanning device.

If a tapped secondary is used to produce the required voltages, it is necessary to introduce appropriate rectifying and filtering means into the secondary circuit so that an even potential may be maintained while each image is being formed. This is not shown in the diagram, as it forms no part of this invention. Instead of a transformer with a tapped secondary, it is obvious that any other appropriate power supply unit could be used, such as those commonly employed for radio receivers, the various voltages being provided by voltage dividers consisting of tapped resistances.

In utilizing the present invention for transmitting television images in their natural colors, the scene being televised may be scanned by the indirect or "flying-spot" method, using red, green and violet light respectively for successive scannings. These colors may be obtained from polarized light by apparatus similar to that herein described and illustrated by Figs. 1 and 2. The reflected light is picked up by photo-electric cells in the conventional manner, but the amount of light received by these cells at any instant will be proportional to the amount of the color then being used that is reflected. Thus, red objects will reflect only red rays; green objects, only green; yellow objects, both red and green rays; and white objects, red, green and violet rays. The current output of the photo-electric cells is amplified and used to modulate the transmitted carrier just as is done in black and white, or monotone, television.

A complete natural color television receiving system embodying the invention herein described is shown in Fig. 3. The television signals are received and amplified by the television receiver 17, and the amplified current passes through wires 18 and 19 to the light source A. This modulated light passes through the polarizer B, the Kerr cell Y, the analyzer H, the optical system T, a light directing section 10 of scanner 9, and thence to the screen 11. While the red image is being transmitted, the segment R of rotating disc J is in contact with brush L. The negative charge from source 16 then passes through wire W, brush X, disc J, segment R, brush L, and wire 20 to plate Z1 of Kerr cell Y. The opposing positive charge passes directly from source 16 through conductor U to plate Z2. Inasmuch as extra resistance has not been introduced into this circuit, plates Z1 and Z2 will have the maximum potential. When disc J has turned so that segment G is in contact with brush M, the charge on the plates Z1 and Z2 is reduced by the presence in the circuit of resistance S2; and resistance S1 is also included in the circuit when segment V reaches brush N. The initial potential and the values of S1 and S2 are so adjusted that red, green and violet rays pass through the analyzer when segments R, G and V respectively are in contact with their cooperating brushes.

The scanner 9 is rotated by shaft 12, connected to a synchronous motor 21. On this shaft is mounted gear 13, meshing with gear 14, which has a ratio of 3 to 1 with gear 13. Gear 14 is attached to shaft 15, to which is also attached disc J. It will thus be seen that scanner 9 makes three revolutions to every one revolution of disc J, and the image is thus scanned once while each of the three segments contact their cooperating brushes, and the resulting images on screen 11 will therefore successively be red, green and violet. Scanner 9 must of course be synchronized with the corresponding scanner at the transmitter, and disc J must also be coordinated with the corresponding member at the transmitter that controls the colors with which the scene is scanned. The synchronizing and coordinating systems are neither described nor shown, as they form no part of this invention proper.

If red, green and violet pictures of the scene being televised, are transmitted and received within the time period of the persistence of vision, the three differently colored images—each having in every part the proper intensity of color—will blend upon the retinas of the observers' eyes, thus recreating the scene in natural colors.

Obviously, the type of scanning system used is immaterial to the invention, and a scanning disc is used in Fig. 3 for the sake of simplicity only.

The methods and apparatus herein described are also applicable to colored motion pictures and the like, and it is not intended to confine the use of the invention to television alone.

Having described my invention in connection with illustrative embodiments, forms, proportions, and arrangements of parts, it will be understood that many variants thereof are possible to those skilled in the art, and my invention, in its broader aspects, is not limited to the specific construction herein described and shown, as changes in the sizes, proportions, configurations, arrangements, assemblage, interaction, juxtaposition, and mechanical relations, as well as additions, omissions, substitutions, combinations, and alterations of forms, parts, members, and features, may be made without departing from the broad spirit of this invention.

Having thus disclosed my invention, I claim and desire to secure by Letters Patent:

1. In a television device, the combination of a source of polychromatic light; a polarizer; a transparent medium which rotates the plane of polarization of a beam of polarized light when in a magnetic field; a scanning system; an analyzer positioned to direct light therethrough to the scanning system; a viewing area; a magnetic field acting upon the transparent medium; and automatic means adapted to change the strength of the magnetic field with each complete scanning of the viewing area, and to maintain said field at a uniform strength during each complete scanning of said viewing area.

2. In a television device, the combination of a source of polychromatic light; a polarizer; a Kerr cell; a scanning system; an analyzer positioned to direct light therefrom to said scanning system; a viewing area; and automatic means adapted to change the electrical potentials applied to the Kerr cell electrodes for each succeeding scanning of the viewing area and to maintain said field at a uniform strength during each scanning of said area.

3. A combination including a source of polychromatic light; a polarizer; a transparent medium which rotates the plane of polarization of a beam of polarized light when in a magnetic field; an analyzer; a magnetic field acting upon the transparent medium; and automatic means for changing the strength of the magnetic field at predetermined regular intervals only.

4. A combination including a source of polychromatic light; a polarizer; a Kerr cell; an analyzer; an automatic means for changing the electrical potentials applied to the Kerr cell electrodes after successive time intervals, said intervals of substantially equal duration.

5. A combination including a source of polychromatic light; a polarizer; a transparent medium which rotates the plane of polarization of a beam of polarized light when in a magnetic field; an analyzer; an electro-magnet; a source of direct current; an electrical conductor leading from said current source to said magnet; other electrical conductors connected to said magnet, each of said other conductors having a different resistance; and automatic means for connecting each of said other conductors individually to said current source in a predetermined sequence within the time period of the persistence of vision.

6. A combination including a source of polychromatic light; a polarizer; a Kerr cell; an analyzer; a multi-voltage supply unit; an automatic switching mechanism; electrical conductors connecting said multi-voltage supply unit, said Kerr cell and said automatic switching mechanism; said switching mechanism adapted to automatically energize each of said conductors individually during the time period of the persistence of vision.

7. A combination including a source of polychromatic light; a polarizer; an analyzer; electrically operated means for rotating the plane of polarization of polarized light; and automatic means for changing at regular predetermined intervals the electrical potentials applied to said electrically operated means for rotating the plane of polarization, and for maintaining said potentials at a uniform value between successive intervals of said regular intervals.

8. A combination including a source of polychromatic light; a polarizer; an analyzer; electrically operated means for rotating the plane of polarization of polarized light; a source of direct current; electrical circuits leading from said current source to said electrically operated means, said circuits having different resistances; and automatic means for opening and closing said circuits in a predetermined sequence during the time period of the persistence of vision.

9. A combination including a source of polychromatic light; a polarizer; an analyzer; electrically operated means for rotating the plane of polarization of polarized light; a source of direct current; electrical circuits leading from said current source to said electrically operated means, said circuits having different resistances; and automatic rotatable commutating means for connecting said electrically operated means for rotating the plane of polarization to said current source by means of said circuits individually in a predetermined regular sequence within the time period of the persistence of vision.

10. In a television device, a combination including a source of polychromatic light; a viewing area; a scanner adapted to scan said area; a polarizer; an analyzer; electrically operated means for rotating the plane of polarization of polarized light; a multi-voltage supply source; an automatic switching mechanism; electrical conductors connecting said multi-voltage supply source, said automatic switching mechanism and said electrically operated means for rotating the plane of polarization; said switching mechanism adapted to connect automatically with a different conductor for each successive scanning of the viewing area.

11. The method of natural color television transmission which includes: passing a beam of polychromatic light through a polarizer; rotating the plane of polarization of the emerging polarized beam through a predetermined angle by electrical means; passing the rotated beam through an analyzer; directing the colored beam thus obtained to a scanning means; and changing the degree of rotation of said polarized beam for successive scannings of the image only.

12. The method of producing images in colors which includes: passing a beam of polychromatic light through a polarizer; rotating the plane of polarization of the emerging polarized beam through a predetermined angle by electrical means; passing the rotated beam through an analyzer; forming an image with the colored light thus obtained; and changing the degree of rotation of said polarized beam for the formation of each successive image only.

13. The method of reproducing television images in colors which includes: passing a beam of polychromatic light through a polarizer; rotating the plane of polarization of the emerging polarized beam through a predetermined angle by electrical means; passing the rotated beam through an analyzer; directing the colored beam thus obtained to a scanning means; and changing the degree of rotation of said polarized beam for each successive scanning cycle, and maintaining substantially the same degree of rotation of said polarized beam throughout a complete scanning cycle.

14. The method of producing images in color which includes: passing a beam of polychromatic light through a polarizer; rotating the plane of polarization of the emerging polarized beam through a predetermined angle by electrical means; thence passing said beam through an analyzer; forming an image with the colored light thus obtained; and changing the potential applied to said electrical means for the formation of successive images only.

15. The method of producing images in color which includes: passing a beam of polychromatic light through a polarizer; then passing the resulting polarized beam through an electrically operated means for rotating the plane of polarization of polarized light; thence passing the emerging rotated beam through an analyzer; forming an image with the colored light thus obtained; and changing the potential applied to said electrically operated means for the formation of successive images only.

16. The method of producing images in color which includes: passing a beam of polychromatic light through a polarizer; thence passing the resulting polarized beam through an electrically operated means for rotating the plane of polarization of polarized light; thence passing the emerging rotated beam through an analyzer; forming an image with the colored light thus obtained; maintaining the potential applied to said electrically operated means at a substantially constant value during the formation of said image; and changing the potential for the formation of each successive image.

17. The method of imparting natural colors to light-formed images, including separating polychromatic light into its component colors by first polarization, then passing said polarized light through a transparent substance, subjecting said substance to an electromagnetic stress, and passing the light rays so treated through an analyzer whereby a single color is abstracted from said polychromatic light, directing said color to an image-forming area through a scanning means, maintaining said color throughout one complete formation of the image, successively changing the color after each complete image-formation by changing the strength of the magnetic field.

18. The method of imparting color to light-formed images, including modulation of a source of white light by an incoming signal from a transmitting station, polarizing said light, passing the polarized light through a transparent dielectric adapted to be electrostatically stressed, passing the light beam from said dielectric through an analyzer, whereby a single color is obtained from said light source, directing said colored light to a scanning means, scanning a viewing area with said colored light, changing the color of said light synchronously with each cycle of image-formation by changing the degree of electro-static stress to which said dielectric is subjected.

19. The method of natural color television reception, including the modulation of a source of white light and the incoming signal from a transmitting station, polarizing said modulated light, admitting the polarized light to a transparent medium which rotates the plane of polarization of polarized light under the influence of a magnetic field, impressing a magnetic field upon said medium, passing the light thus treated through an analyzer thereby deriving one of the component colors of said original light, directing said colored light to a scanning system, and changing the color from said analyzer for each successive scanning of the viewing area by changing the intensity of said magnetic field acting upon the transparent medium.

20. The method of coloring light-formed images, including modulating a source of white light in accordance with the illumination of the object to be shown, polarizing the modulated light, admitting the polarized light to a Kerr cell, thence passing the light through an analyzer to a scanning system, and changing the color of the light from the analyzer for successive scannings of the image by changing the potentials across the electrodes of the Kerr cell.

21. In color television, the combination of a viewing area; a scanning device, a source of polychromatic light; a polarizer for said light; a transparent medium which becomes doubly refracting in a magnetic field; an analyzer; means for directing said polarized light through said medium and thence through the analyzer; a magnetic field impressed on said medium; means for varying said field; means for directing light from said analyzer to the scanning device; and means for connecting said magnetic changing means with the scanning means so that the density of said field is maintained constant throughout one scanning cycle, and is changed with each succeeding scanning cycle.

LE ROY J. LEISHMAN.